Figure 1:
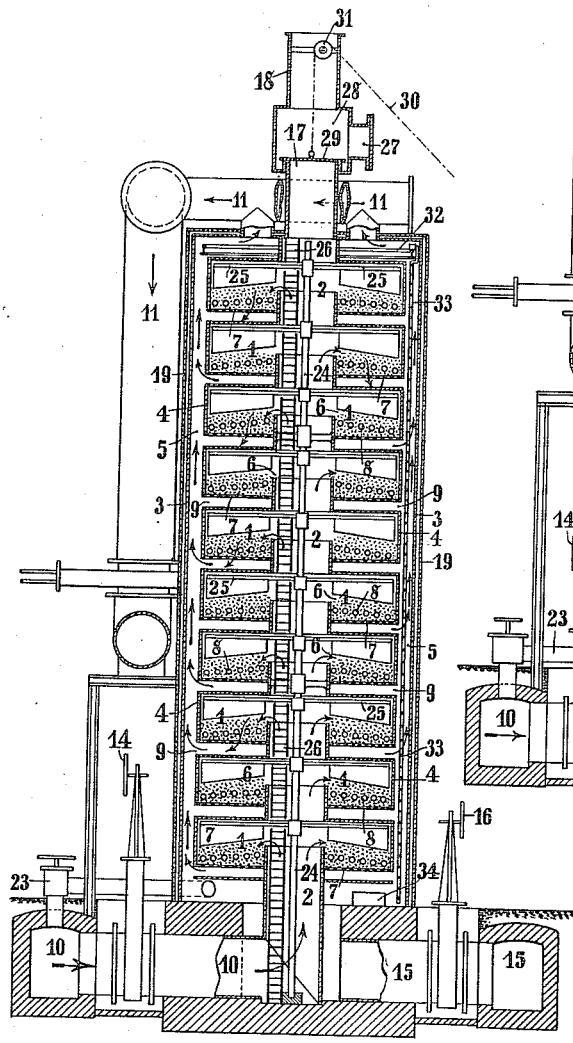

P. WURTH.
APPARATUS FOR DRYING AIR.
APPLICATION FILED NOV. 7, 1910.

995,513.

Patented June 20, 1911.

4 SHEETS—SHEET 1.

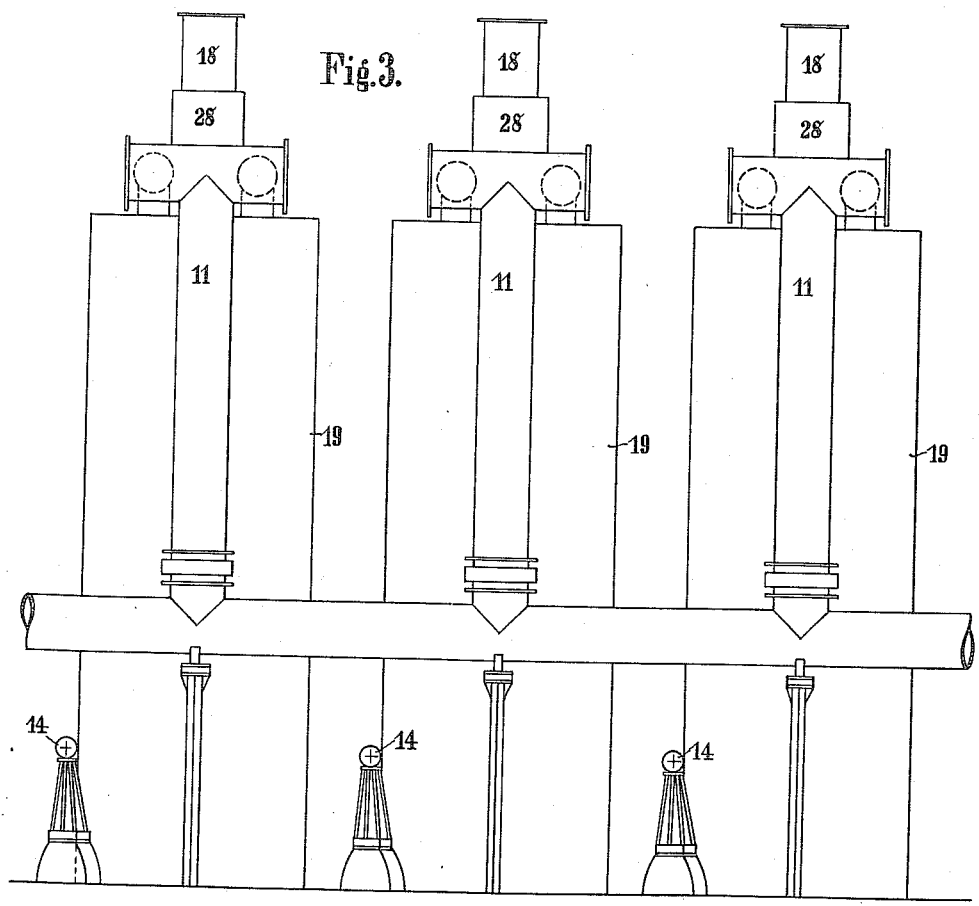

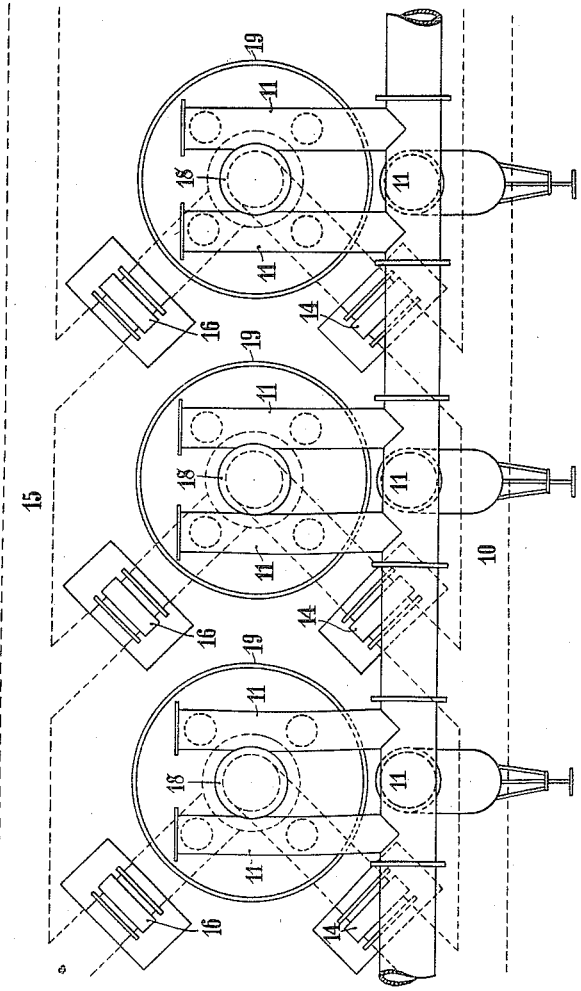

P. WÜRTH.
APPARATUS FOR DRYING AIR.
APPLICATION FILED NOV. 7, 1910.
995,513.
Patented June 20, 1911.
4 SHEETS—SHEET 4.
Fig. 5.
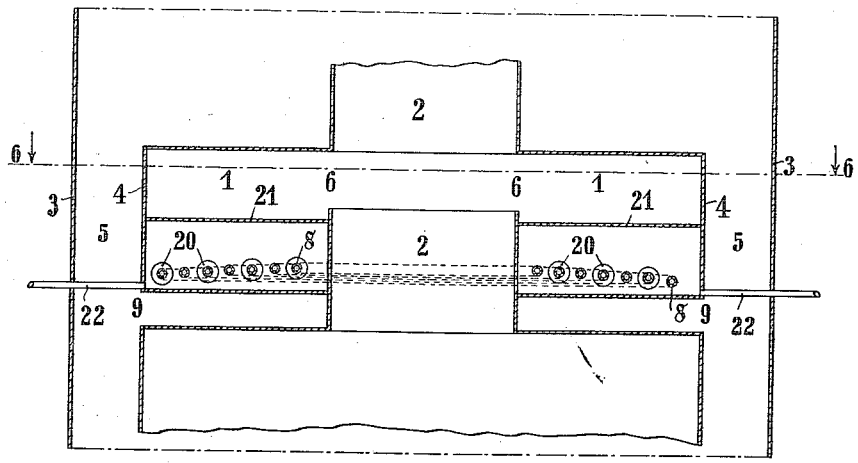
Fig. 6. (6—6)
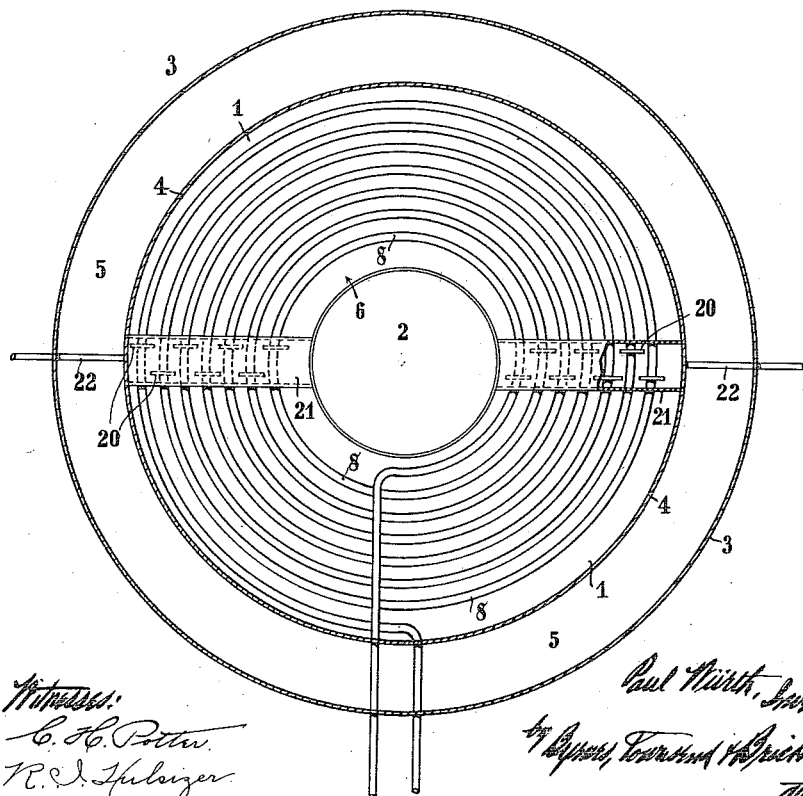

UNITED STATES PATENT OFFICE.

PAUL WÜRTH, OF LUXEMBURG, LUXEMBURG.

APPARATUS FOR DRYING AIR.

995,513.        Specification of Letters Patent.    Patented June 20, 1911.

Application filed November 7, 1910. Serial No. 591,095.

*To all whom it may concern:*

Be it known that I, PAUL WÜRTH, engineer, a citizen of the Grand Dukedom of Luxemburg, residing at Luxemburg, Grand Duchy of Luxemburg, have invented certain new and useful Improvements in Apparatus for Drying Air, of which the following is a specification.

This invention relates to an apparatus for drying purposes and in particular for drying the air for blast furnaces, with the aid of chlorid of calcium, by means of which it is possible to utilize chlorid of calcium for drying the enormous quantities of air used in blast furnace practice and to regenerate the calcium chlorid *in situ*.

The apparatus comprises a so-called column plant and contains the calcium chlorid receptacles arranged one above the other. Above the layer of the calcium chlorid each receptacle is provided with an opening leading to a central shaft common to all the receptacles and dividing the blast into sheets. Beneath the layer of calcium cholrid a second opening is arranged in each receptacle leading to an annular space formed by the outer wall of each receptacle and the casing of the apparatus. In this annular space the sheets of the blast are then united. The construction may be also such that each of the superposed chlorid of calcium receptacles is provided, above the layer of chlorid of calcium between the outer wall of a receptacle and the casing of the apparatus, with an opening dividing the blast into sheets and with another opening beneath the layer of chlorid of calcium leading to the shaft common to all receptacles and in which shaft the sheets of blast are united.

In the former construction the blast is introduced into the central shaft and divided into sheets for the individual receptacles by the opening. It passes from the individual receptacles to the annular space in which the individual dried sheets of blast are united whence they pass as a whole to the place of action.

According to the second constructional form, the blast enters the annular chamber between the outer walls of the individual receptacles and the housing of the apparatus and is divided into sheets by the openings at the outer walls, which sheets, after traversing the layer of calcium chlorid are united in the central shaft whence they pass to the place of action after drying.

In order to regenerate the calcium chlorid the central shaft or the annular space besides communicating with the blast conduit is connected to a hot air or hot gas supply conduit and both the blast and the gas conduit are provided with controlling mechanism in the form of slides, valves, or the like, so that after cutting off the blast conduit, hot air or gas may be passed over the calcium chlorid for regenerating purposes and inversely after cutting off the hot gas or air supply conduit, the blast to be dried may be caused to pass over the calcium chlorid for drying purposes.

It may occur that the blast currents form, in some of the layers of chlorid of calcium, passages which would be traversed by a portion of the blast without the latter giving off its whole moisture to the chlorid of calcium. By the provision of the central shaft this drawback is overcome in a simple manner inasmuch as the shaft offers a space for the arrangement of a spindle attached to which, in the manner of a stirring mechanism, are wipers slowly moving over the chlorid of calcium and closing any air passages that may have been formed.

It is known that chlorid of calcium while being deprived of its moisture becomes heated and that this heating, which diminishes the capability of absorption of the calcium chlorid, can be avoided by cooling with the aid of cooling coils. After cutting off the water supply and emptying the coils it may occur that some cooling water remains in the coils. During the regeneration of the chlorid of calcium by admission of hot gases or air the residue of the water would evaporate thereby causing an unnecessary consumption of the heat. In order to prevent this cooling coils are arranged at a certain inclination so that any residue of cooling water is drained off during the discharge of the coils. It may moreover occur that at the connecting sockets of the cooling coils leakages are produced which would cause cooling water to escape to the calcium chlorid. In order to prevent this the connecting sockets are located in a box which is water tight against the chlorid of calcium and is provided with an outwardly leading discharge. Thus the chlorid of calcium is prevented from becoming wetted owing to the leakages on the one hand and on the other hand if any leakages occur they are immediately noticeable at the outwardly leading discharge and can therefore be stopped without delay.

Figure 2:
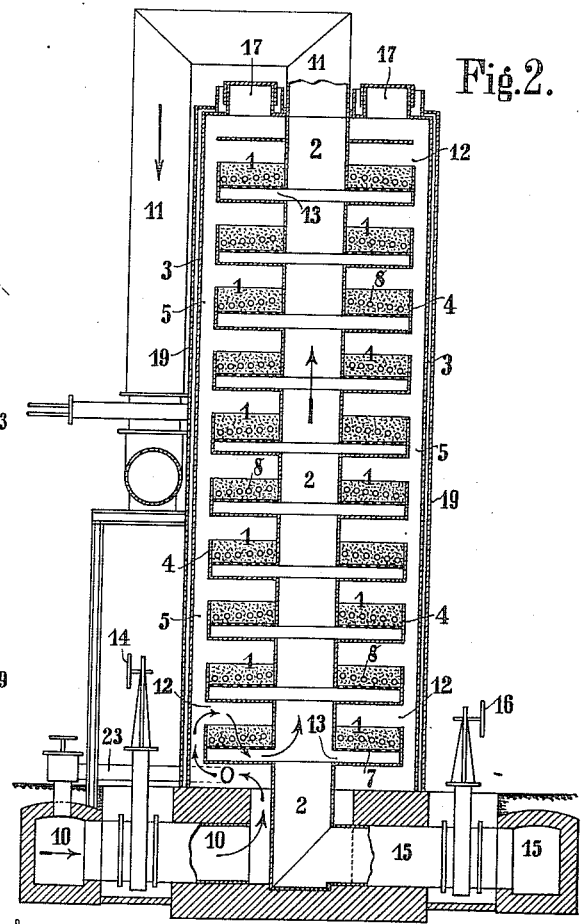
Figure 7:
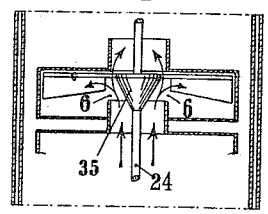

Two constructional forms of the apparatus are shown by way of example in the accompanying drawings in which:

Figure 1 illustrates one form diagrammatically in longitudinal section and Fig. 2 the second form diagrammatically in longitudinal section. Figs. 3 and 4 represent in elevation and plan view respectively a plant consisting of several drying columns. Figs. 5 and 6 show details of the cooling coil in longitudinal section and plan view respectively and Fig. 7 represents a detail of the blast distributing device.

According to Figs. 1 and 2 the apparatus which is of cylindrical form comprises a number of similar compartments 1, a central open shaft 2 and a housing 3. The housing 3 forms together with the outer wall 4 of the compartments 1 an intermediate annular space 5.

As shown in Fig. 1 each compartment 1 is provided with an annular inlet opening 6 and comprises a sieve 7 supporting the calcium chlorid, a cooling water coil 8 arranged above the sieve 7 in the lower half of the calcium chlorid mass, and an annular outlet opening 9 in the space beneath the sieve 7. For drying, the blast is blown by a ventilator through the supply passage 10 into the central shaft 2. This air blast is uniformly and simultaneously distributed through the openings 6 over the individual compartments 1, and the air traveling slowly through the calcium chlorid in downward direction gives off its moisture to the latter, passes down through the sieve 7 and escapes through the opening 9 into the annular space 5. The air currents from the compartments rise along the housing 3 in which they are united and at the upper part of the apparatus enter the conduit 11 through the plurality of pipes whence they pass to the blast engine.

As shown in Fig. 2, the outer walls 4 are provided above the layer of calcium chlorid with inlet openings 12 and below that layer with outlet openings 13 terminating in the central shaft 2. In this construction the blast to be dried passes through the blast passage 10 first into the annular space 5 and is divided into sheets by the openings 12 in the outer wall. These sheets traverse the sieves 7 and at 13 enter the central shaft 2 whence they escape as a whole into the conduit 11.

On the chlorid of calcium having absorbed the admissible quantity of water the apparatus is cut off from the inlet and outlet conduits of the blast by slides 14 and is caused to communicate with the conduit 15 for the hot air or gases by the opening of a slide 16. As the initial temperature must not rise too abruptly cold air is sucked in and blown into the apparatus by the pump simultaneously with the gases. By lessening the admission of air and increasing the admission of gas, the temperature is gradually raised until it reaches about 235° C. at which the best conditions for the regeneration of the calcium chlorid are attained.

In the construction shown in Fig. 1, the hot air or gases pass from the conduit 15 to the annular space 5 and then through the openings 9 below the sieve 7 whence they traverse the chlorid of calcium in upward direction and in depriving it of water pass through the openings 6 to the central shaft 2 and escape at the top through the opening 17 of the chimney 18. Thus in this case their direction is opposite to that of the blast to be dried, which is necessary for a rapid regeneration of the mass. Also in this case a uniform distribution of gas is maintained and moreover a rapid heating of the whole apparatus is attained because the hot gases form a heating wrapper. In order to lessen the losses of heat by radiation it is in some cases advisable to convey the heat medium first through the central shaft. In this case the hot gases will travel along the same course during the regeneration as the air to be dried during the drying operation. In order to reduce the radiation of heat to a minimum the whole apparatus can be surrounded with a heat protecting medium or a metal mantle 19. The intermediate space thus formed can be filled with cold air or hot gases according to whether the drying or regenerating operation takes place.

In the construction illustrated in Fig. 2 the hot air used for the regeneration enters through the shaft 2 and escapes into the annular space 5 whence it is drawn off through the openings 17.

The heating of the calcium chlorid which would take place during the drying is prevented by the cooling coils 8 already mentioned. These coils according to Figs. 5 and 6 are arranged spirally at an incline so as to produce a constant down-grade from the first to the last coil portion. The object of this is that after cutting off the admission of water the cooling water is drained from the coils without leaving any residue in order to prevent the absorption of heat for its evaporation at the subsequent high regenerating temperature (about 235° C.). Moreover as seen in Fig. 6 all connecting parts 20 meet on one or several radial lines and are surrounded by water tight boxes 21. Into these boxes any escaping water is caused to drip off and is removed through a drain pipe 22 leading to the outside. In this manner not only is the water prevented from coming into contact with the chlorid of calcium; but the attendant's attention is immediately drawn to any leakage at any of the connecting sockets. In order to protect these boxes more efficiently against heat they can be filled with sand or the like.

After the regeneration of the chlorid of calcium the apparatus is first cooled by a cold blast entering the space 5 through the conduit 23 and escaping from the opening 17 after which water is supplied to the cooling coils until the temperature is sufficiently lowered, when the apparatus is ready for the recommencement of the drying operation of the blast. As during the regeneration and cooling of the apparatus the blast must be dried by a different apparatus at least two such units are required for one complete plant. In the plant shown in Figs. 3 and 4 three such units are illustrated of which one is used for the drying of the blast the second for the regeneration of the calcium chlorid and the third for cooling purposes. A fourth apparatus may be added as a reserve if desired. Since in most blast furnace plants only a small space is provided in proximity to the furnace it is important that in spite of the necessary large contact surfaces for the drying of the blast only a small ground space is occupied. This condition is entirely fulfilled by the present arrangement owing to the provision of many compartments arranged in the form of a column above one another. Owing to the central admission or discharge and the annular discharge or admission, the distribution of the blast or of the regenerating air over the chlorid of calcium and the penetration thereof through the latter are rendered as uniform as possible. In order to obtain a perfect distribution of the blast in the various sections or compartments the arrangement illustrated in Fig. 7 can be used in connection with the apparatus shown in Fig. 1.

Suitably arranged within the central shaft 2 are distributing cones 35 deflecting the air in the compartments. Moreover wings can be arranged on the spindle 24 in a manner similar to the ventilators of rooms, in order to throw the air into the compartments. If the blasts have a tendency to select certain compartments, this can be prevented by graduating the height of the layer of the calcium chlorid or by tapering the inlet openings from one compartment to the other. Or the height of the layer of calcium chlorid in an individual compartment can be so arranged from the central shaft toward the housing as to thereby attain a uniform passage of the blast through the whole mass.

It may occur that during the operation air passages are formed in the mass of chlorid of calcium and this can be prevented by the arrangement of the central shaft in the following manner: A vertical spindle 24 journaled at its ends is arranged to extend centrally through the shaft and to carry in each compartment opposite to the opening 6 a horizontal arm 25 provided with asbestos strips. This spindle 24 is caused to slowly rotate thereby causing the asbestos strips to wipe over the surface of the chlorid of calcium and to fill up the air passages that may be formed. These wipers could only be used in connection with the construction shown in Fig. 1 in which the inlet opening for the blast is located at the central shaft.

The central shaft enables all compartments to be easily inspected and accessible. The charging, recharging and cleaning is very simple inasmuch as there is no necessity to provide doors between the calcium chlorid and the collecting chamber for the blast. For supervisory purposes a ladder 26 extends along the whole height through the central shaft and is interrupted only at short intervals in order to clear the wipers. Access to the shaft is had through the man hole 27 in the upper part of the apparatus. Even during the drying operation the apparatus can be easily inspected by entering the man hole 27 in the space 28 then closing the man hole and raising the cover 29 which is guided by a rope 30 on a roller 31 (Fig. 1). This cover is thus caused to rise to the top of the space 28 and then immediately close the shaft again.

In the annular space 5 a ladder 33 running on rails 32 is arranged by means of which the whole of the annular space can be easily inspected. The fine dust particles which drop from the calcium chlorid charge through the sieve can be removed with the aid of this ladder for instance by suction devices or in some other appropriate manner. A complete cleaning of the apparatus can be effected with the aid of steam or by means of a water jet. The whole of the cleaning water collects at the bottom and is drained off through an appropriate outlet 34.

What I claim is:—

1. An apparatus for drying air comprising a casing, a series of superimposed receptacles for drying material having perforated bottoms, and means constructed and arranged to cause the air to be dried to pass through said receptacles.

2. An apparatus for drying air comprising a casing, a series of superimposed receptacles for drying material having perforated bottoms, means constructed and arranged to cause the air to be dried to pass through said receptacles in one direction, and means constructed and arranged to cause a current of gases to pass through such receptacles in an opposite direction.

3. An apparatus for drying air comprising a casing, a series of superimposed receptacles for drying material having perforated bottoms mounted in such casing but spaced from the walls thereof to form an air conduit, a conduit extending through the receptacles and having an open connection to each receptacle at one side of its perforated bottom, and connections from the other side of said bottoms to the first-mentioned conduit, whereby the air to be dried is forced to pass through the drying material.

4. An apparatus for drying air comprising a casing, a series of superimposed receptacles for drying material having perforated bottoms mounted in such casing but spaced from the walls thereof to form an air conduit, a conduit extending through the receptacles and having an open connection to each receptacle at one side of its perforated bottom, connections from the other side of said bottoms to the first-mentioned conduit, whereby the air to be dried is forced to pass through the drying material, air supply and delivery pipes connected to such conduits, a second set of gas delivery and supply pipes connected respectively to said supply and delivery conduits, and valve connections arranged to permit the air or gas to be passed through the apparatus.

5. An apparatus for drying air comprising a casing, a series of superimposed receptacles for drying materials mounted in such casing but spaced from the walls thereof, said receptacles having bottoms provided with perforations opening into the casing, a conduit extending through the receptacles and having an open connection to each receptacle above the bottom thereof, and pipes for supplying air blast to the conduit and for delivering air from the casing.

6. An apparatus for drying air comprising a casing, a series of superimposed receptacles for drying materials mounted in such casing but spaced from the walls thereof, said receptacles having bottoms provided with perforations opening into the casing, a conduit extending through the receptacles and having an open connection to each receptacle above the bottom thereof, pipes for supplying air blast to the conduit and for delivering air from the casing, additional pipes for delivering gas into the casing and from the conduit, and valves in such pipes.

7. An apparatus for drying air comprising a receptacle for drying material, a wiper arranged in said receptacle to move over the surface of said material, and means for operating said wiper.

8. An apparatus for drying air comprising a series of superimposed receptacles for drying material, a conduit extending through said receptacles, a shaft in said conduit, and wipers connected to said shaft and extending into said receptacles.

9. An apparatus for drying air comprising a receptacle for drying material and a cooling coil located in such receptacle, said coil being formed of sections joined together, a water-tight box inclosing the joints, and means for draining the box.

10. An apparatus for drying air comprising a casing, a series of superimposed receptacles for drying material mounted in such casing, a conduit extending through said receptacles and having an open connection to each receptacle, and deflectors in front of said open connections to direct the air from the conduit into the receptacles.

In testimony whereof, I affix my signature in presence of two witnesses.

PAUL WÜRTH.

Witnesses:
 DÉSIRÉ DERULLE,
 LEON BRIX.